United States Patent
Naim et al.

(10) Patent No.: US 9,626,348 B2
(45) Date of Patent: Apr. 18, 2017

(54) AGGREGATING DOCUMENT ANNOTATIONS

(75) Inventors: Oscar Gerardo Naim, Redmond, WA (US); Lucretia Henrica Vanderwende, Sammamish, WA (US); Krist Wongsuphasawat, Silver Spring, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/045,535

(22) Filed: Mar. 11, 2011

(65) Prior Publication Data

US 2012/0233150 A1 Sep. 13, 2012

(51) Int. Cl.
G06F 17/30 (2006.01)
G06F 17/24 (2006.01)

(52) U.S. Cl.
CPC ...... *G06F 17/241* (2013.01); *G06F 17/30864* (2013.01); *G06F 17/30882* (2013.01)

(58) Field of Classification Search
CPC .......... G06F 17/2785; G06F 17/30731; G06F 17/30734; G06F 17/30572; G06F 17/30525; G06F 17/30911; G06F 17/30946; G06F 17/241; G06F 17/30864; G06F 17/30882; G06F 17/30539; G06F 17/30011; G06F 17/218; G06N 17/30572
USPC ................................. 707/722, 739
See application file for complete search history.

(56) References Cited

U.S. PATENT DOCUMENTS

| | | | |
|---|---|---|---|
| 4,864,502 A * | 9/1989 | Kucera et al. | 704/8 |
| 7,418,656 B1 * | 8/2008 | Petersen | 715/230 |
| 7,555,713 B2 | 6/2009 | Yang | |
| 7,778,982 B2 | 8/2010 | Baker | |
| 8,005,835 B2 * | 8/2011 | Walther et al. | 707/736 |
| 8,086,607 B2 * | 12/2011 | Orumchian et al. | 707/737 |
| 2004/0122846 A1 | 6/2004 | Chess et al. | |
| 2004/0243614 A1 | 12/2004 | Boone et al. | |
| 2005/0086188 A1 * | 4/2005 | Hillis et al. | 706/50 |
| 2005/0160355 A1 * | 7/2005 | Cragun et al. | 715/512 |
| 2005/0256866 A1 * | 11/2005 | Lu et al. | 707/5 |
| 2007/0150800 A1 | 6/2007 | Betz et al. | |
| 2007/0179776 A1 | 8/2007 | Segond et al. | |
| 2007/0294614 A1 * | 12/2007 | Jacquin et al. | 715/512 |
| 2008/0282187 A1 * | 11/2008 | Buschman et al. | 715/784 |

(Continued)

OTHER PUBLICATIONS

Joosse, W., "User Trainable Fact", Retrieved at <<http://hmi.ewi.utwente.nl/verslagen/afstudeer/JoosseWouterFinalThesis.pdf >>, Jun. 2007, pp. 1-86.

*Primary Examiner* — Evan Aspinwall
(74) *Attorney, Agent, or Firm* — Medley, Behrens & Lewis, LLC

(57) ABSTRACT

Technologies pertaining to annotation aggregation are described herein. A user of a computing device assigns an annotation to a portion of a document, wherein the annotation comprises a tuple. The tuple comprises semantic relationships amongst words or phrases in the document. Relationship data is also generated, wherein the relationship data identifies the document, the author of the document, the author of the annotation, and other data. The annotations and relationship data are transmitted to a data store, where such information is aggregated with other annotations made by other annotators to various documents, thereby creating a network of knowledge

20 Claims, 9 Drawing Sheets

(56) References Cited

U.S. PATENT DOCUMENTS

| | | | |
|---|---|---|---|
| 2009/0070322 A1* | 3/2009 | Salvetti et al. | 707/5 |
| 2009/0222759 A1* | 9/2009 | Drieschner | 715/780 |
| 2010/0031141 A1 | 2/2010 | Summers et al. | |
| 2010/0169299 A1 | 7/2010 | Pollara | |
| 2010/0228693 A1* | 9/2010 | Dawson et al. | 706/12 |
| 2010/0228794 A1* | 9/2010 | Roy et al. | 707/809 |
| 2010/0332964 A1* | 12/2010 | Duman et al. | 715/230 |
| 2011/0040787 A1* | 2/2011 | Cierniak et al. | 707/770 |
| 2011/0246461 A1* | 10/2011 | Jung et al. | 707/736 |

\* cited by examiner

AGGREGATING DOCUMENT ANNOTATIONS

BACKGROUND

Reviewers of documents often write annotations in the margins of pages that are being read. These annotations can indicate a reviewer's thoughts on a particular passage in a document, can highlight a portion of the document that the reviewer finds important, etc. Thereafter, if the reviewer subsequently reviews the document, the reviewer can quickly locate portions of the document that the reviewer previously found important, and can review annotations in the margins to refresh the memory of the reviewer.

In a particular example, a researcher (one who is researching a particular topic to generate a research paper) can read numerous documents and can annotate several of such documents in connection with generating a new research paper that is germane to the topics that are discussed in the documents being reviewed by the researcher. When composing the resulting research paper, the researcher can review the multiple annotations made to the papers for purposes of citation and analysis.

In another example, students often annotate textbooks or articles in an effort to improve memory regarding a particular topic that is discussed in the textbooks or articles. Thus, when a student attempts to commit a particular topic to memory, the student need not re-read the entire portion of a textbook, but can quickly review the annotations made previously by the student.

It can be ascertained, however, that while a single individual can annotate literary works to add some value to such literary works, these annotations remain solely accessible to the annotator. Therefore, while a second researcher, for instance, may find the annotations of a first researcher to be quite useful with respect to a particular topic, the second researcher will be unable to easily obtain these annotations even if the first researcher wished to share them. This is because conventionally the annotations are made in the margins of paper documents, which are not easily shareable amongst several people.

Some word processing applications have been implemented with functionality that allows users of such applications to provide or enter comments corresponding to particular portions of text being displayed by way of the word processing application. Enabling researchers to annotate documents in the word processing application allows for sharing of annotations to be done somewhat more readily, as a word processing document can be e-mailed between researchers and word processing documents can be readily duplicated. Effectively sharing annotations using conventional word processing applications, however, requires that the first researcher and second researcher are familiar with one another, and further require that the first researcher has knowledge that the second researcher would like to receive or study the annotations made by the first researcher.

SUMMARY

The following is a brief summary of subject matter that is described in greater detail herein. This summary is not intended to be limiting as to the scope of the claims.

Described herein are various technologies pertaining to aggregating annotations to literary works made by individuals, such that the annotations can be retained, searched and processed in a meaningful manner. Pursuant to an example, an application that can be installed and executed on client computing devices can be configured with functionality that allows the users of such application to review documents and assign annotations to such documents. As will be described herein, these annotations can have a specific format and can be referred to as "facts" that can be assigned to portions of documents by users. The format of a fact includes a tuple, wherein the tuple comprises a first word or phrase, a second word or phrase, and a third word or phrase, wherein the third word or phrase relates the first word or phrase to the second word or phrase. In a more specific example, the first word or phrase can be a subject of a sentence included in a document reviewed by a user, the second word or phrase can be an object of that sentence, and the third word or phrase can be a predicate that relates the subject to the object.

The aforementioned application that is installed on the client computing devices can be further configured with functionality that allows users of such application to easily publish their annotations to a data repository that is accessible to others. In an example, a particular user may review a document in the application and can assign annotations of the aforementioned format to portions of the document. For instance, these annotations can be automatically generated through utilization of one or more predefined extractor modules that search for particular types of sentences, content of sentences, etc. in connection with extracting portions of sentences that can be assigned to the document. Alternatively, the user can manually assign an annotation to the document, wherein such annotation comprises the aforementioned tuple. Once the user has completed assigning annotations to the document, the user can choose to publish these annotations. The annotations can be included in a data packet that is transmitted from the computing device to an aggregation system by way of a network connection, such as the Internet. The data packet can include the annotation as well as relationship data, wherein the relationship data identifies the document to which the annotation was assigned, the portion of the document to which the annotation was assigned, the author of the document to which the annotation was assigned, the identity of the user that generated the annotation, etc. This data packet can be placed in a data repository with several other data packets that have annotations and relationship data of the same format. Once a sufficient number of data packets are aggregated, a user can access the data repository to search for information that is germane to a topic that is of interest to the user.

Pursuant to an example, the application described above can be a word processing application, wherein the word processing application is configured with functionality that allows annotations to be automatically generated and approved or modified by users of the application. In another example, the application can be an Internet browser that is configured with, for instance, a Java application that allows users to review a web page that comprises text or images and assign annotations to portions of text or images shown in the web page, for instance. In either embodiment, users of the application can review and approve annotations prior to the annotations being aggregated in a searchable data repository.

In another exemplary embodiment, extractor modules can be configured to automatically generate annotations of the form described above. For instance, these extractor modules can be configured to search for particular words, particular sentence structures, etc. in connection with automatically generating annotations that comprise a tuple. These annotations can have relationship data assigned thereto, wherein, for instance, the relationship data can indicate a URL of the web page from which the annotation was extracted/generated. Other relationship data can also be retained such as web pages that link to the web page from which the annotation was generated, web pages that are linked from the web page from which the annotation was generated, an author (if not anonymous) of the web page, etc. Again, this data packet (annotations and relationship data) can be aggregated such that the data packet can be utilized, for instance, in assisting a user in performing a web search. Some combination of aggregation of human approved annotations and automatically generated annotations are also contemplated by the inventors and are intended to fall under the scope of the hereto appended claims.

Other aspects will be appreciated upon reading and understanding the attached figures and description.

DETAILED DESCRIPTION

Figure 1:
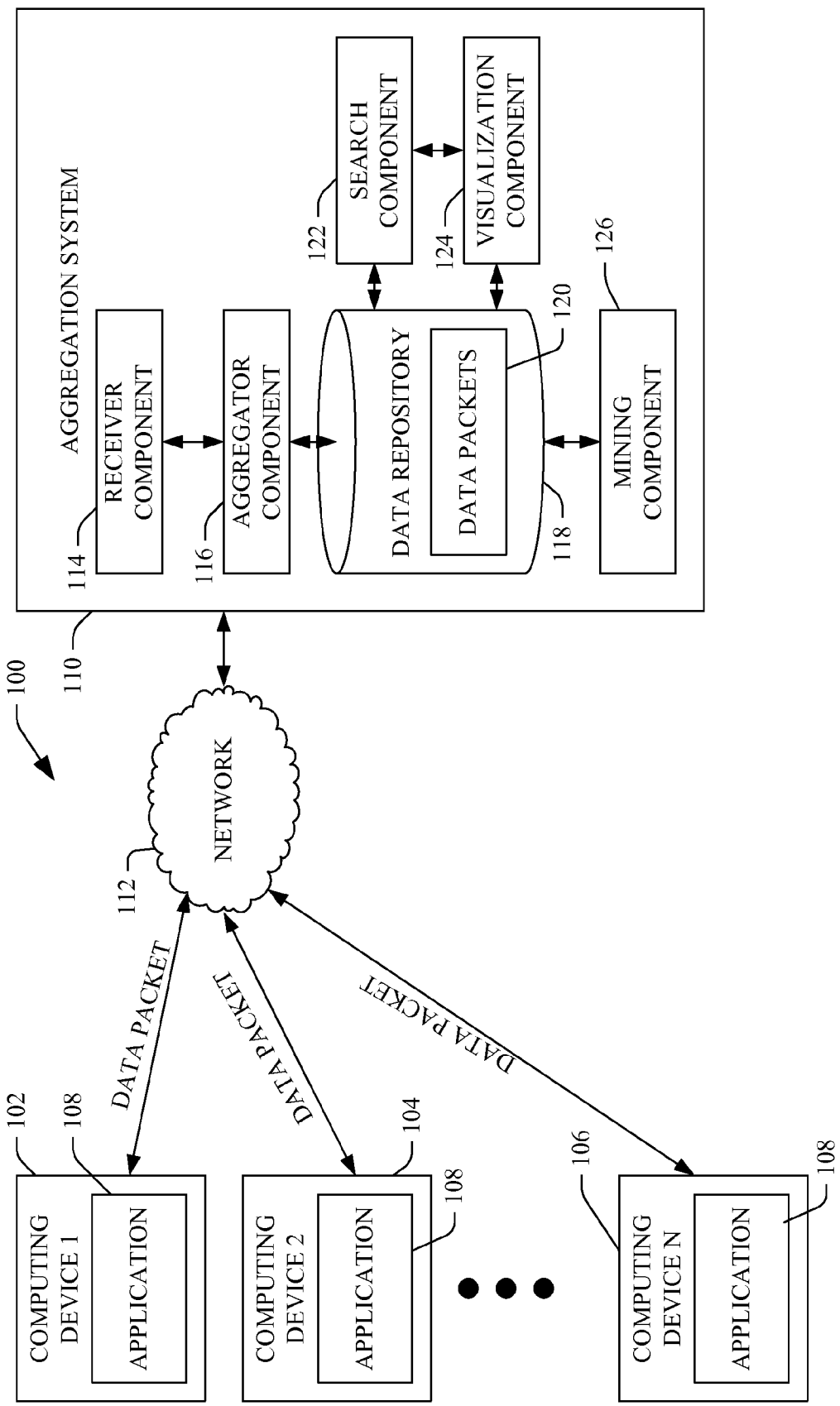
FIG. 1 is a functional block diagram of an exemplary system that facilitates aggregating annotations made to documents from a plurality of users.

Various technologies pertaining to aggregating annotations made to documents will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary system 100 that facilitates aggregating annotations made to documents by multiple users of differing computing devices is illustrated. The system 100 includes a plurality of computing devices 102-106. Specifically, the plurality of computing devices 102-106 comprises a first computing device 102, a second computing device 104, and an Nth computing device 106. Each of the computing devices 102-106 has an application 108 executing thereon. The application 108 can be configured to allow a user to review documents and provide annotations to such documents. Thus, for instance, the application 108 may be a word processing document that comprises functionality that enables a user to provide annotations to a document being reviewed by the user. In another example, the application 108 may be a web browser that allows users to generate annotations to content that is viewable by way of the web browser. It can therefore be ascertained that the application 108 can be a word processing application, an Internet browser, or some other suitable document viewing application, and documents that are viewed by way of the application 108 can be word processing documents, web pages or other suitable pages generated by way of a markup language such as HTML, etc.

Users of the application 108 can assign annotations of a particular format to documents that are being viewed by way of the application 108. Annotations of this particular format can be referred to herein as "facts". A "fact" of the particular format comprises at least three words or phrases: a first word or phrase, a second word or phrase, and a third word or phrase that relates the first word or phrase to the second word or phrase. In a particular example, the first word or phrase can be a subject of a sentence (or parent phrase) in the document, the second word or phrase can be an object of the sentence (or the parent phrase) in the document, and the third word or phrase can be a predicate in the sentence (or the parent phrase) that relates the subject to the object. These facts are thus of the form that are frequently utilized by researchers to annotate documents.

Facts assigned to documents can be approved by users of the application 108, wherein the facts can be generated by the users of the application 108 manually or automatically generated through utilization of one or more extractor modules. An extractor module can be configured to search through documents for particular words, phrases, sentence structures etc. and to automatically generate facts based at least in part upon such search. For instance, an exemplary extractor module can include natural language processing functionality that can identify different portions of sentences in the document. The extractor module may also be configured to search through documents for a particular word, and upon identifying such word in the document, can determine whether the word is a subject or object of a sentence in the document. The extractor module may then analyze the sentence that includes the identified word, and through natural language processing techniques, can automatically ascertain which words or phrases in the sentence is the subject, object and predicate of such sentence. This automatically generated fact can then be presented to the user of the application 108 who can, in turn, approve the automatically generated fact, modify the automatically generated fact, or entirely reject the automatically generated fact. Further, a user of the application 108 can manually assign a fact to a document without the use of an extractor module, so long as that fact has the aforementioned format (e.g., includes the above-described tuple).

Pursuant to an example, a user of the client computing device 102 can initiate the application 108 such that the application 108 is executing on the first computing device 102. The user may cause the application 108 to display a particular document that is desirably reviewed by the user of the first computing device 102. When reviewing such document, the user can generate or review and approve facts that pertain to such document. Thereafter, the user may wish to publish these facts such that they can be reviewed by others who may also be interested in the document, interested in a particular research field that pertains to the document, etc.

Therefore, through utilization of the application 108, the user of the first computing device 102 can choose to publish the facts made to the document that was reviewed through utilization of the application 108.

Upon receiving a command to publish the facts in the document, the application 108 can generate a data packet. This data packet can include the fact, which comprises the tuple of the first word or phrase, the second word or phrase, and the third word or phrase that relates the first and second words or phrases. The data packet generated by the application 108 can also include relationship data, wherein the relationship data can identify relationships between the fact included in the data packet and data pertaining to the document to which the fact is assigned. For instance, the relationship data can comprise first data that indicates the identity of the document to which the fact was assigned. The relationship data can also comprise second data that identifies a portion of such document to which the fact was assigned. Still further, the relationship data can comprise third data that identifies an author of the document. Moreover, the relationship data can comprise fourth data that identifies an author/approver of the fact. It is to be understood that multiple reviewers of various different documents can use the application 108 to review and assign facts to such documents, and may then choose to publish these facts such that they can be shared and reviewed by others.

The system 100 further comprises an aggregation system 110 that is configured to aggregate data packets transmitted from the computing devices 102-106. For instance, the aggregation system 110 may be in communication with the computing devices 102-106 by way of a suitable network 112. Pursuant to an example, the network 112 can be the Internet. In another example, the network 112 may be a cellular network, an intranet or other suitable network such as a LAN, a wireless area network, etc. Responsive to, for instance, the user of the first computing device 102 choosing to publish facts corresponding to a document being reviewed by way of the application 108, at least one data packet is transmitted from the computing device 102 to the aggregation system 110 by way of the network 112. Furthermore, it is to be understood that each of the computing devices 102-106 may transmit multiple data packets to the aggregation system 110 by way of the network 112.

The aggregation system 110 can comprise a plurality of components that are executable by a processor. Thus the aggregation system 110 may be included in, for instance, a server system that comprises at least one processor and corresponding memory, wherein components in the memory are accessible and executable by the processor. The plurality of components comprises a receiver component 114 that receives a data packet transmitted by way of the application 108 executing on the first computing device 102. As described above, the data packet has a first format and includes a fact and corresponding relationship data. The fact has been assigned to a portion of a document being reviewed by the user by way of the application 108, and the fact comprises the aforementioned tuple. Furthermore, the relationship data in some way relates to the fact with the document to which the fact was assigned.

The aggregation system 110 further comprises an aggregator component 116 that is in communication with the receiver component at 114, wherein the aggregator component 116 is configured to place the data packet received by the receiver component 114 with other data packets of the first format in a data repository 118. The aggregator component 116 can cause a plurality of different data packets that were received from a plurality of different computing devices with respect to a plurality of different documents that were assigned a plurality of different facts, and can cause all of such data packets to be retained in a data repository 118 as data packets 120. The aggregator component 116, for instance, can be configured to aggregate the data packets 120 in the data repository 118 in some suitable database format such that the data packets 120 are readily processable by a computer processor. This aggregation of multiple facts pertaining to multiple different documents by different annotators creates a network of knowledge that was heretofore unavailable. In other words, the data packets 120 can be retained in the data repository 118 by the aggregator component 116 in a format that is suitable for a processor to perform at least one processing function over at least one of the data packets in the data packets 120.

For instance, the aggregation system 110 may optionally include a search component 122 that can receive a query by way of the network 112, for instance, and execute a search over the packets 120 in the data repository 118 based at least in part upon the query. For instance, the query received by the search component 122 can include a word or phrase and the search component 122 can be configured to search for facts in the data packets 120 that comprise the word or phrase. The search component 122 may then be configured to output search results to the user responsive to execution of the search over the data packets 120, wherein the search results can include facts that comprise the word or phrase in the query (or related words or phrases) as well as relationship data corresponding to such facts. In another example, the search component 122 can receive the name of an author as a query and the search component 122 can retrieve annotations in the data packets 120 that were authored by the author, or that were assigned to documents that were authored by such author. Thus, for instance, search results output by the search component 122 can include an indication of relationships between documents, document authors, and annotation authors.

The aggregation system 110 may further optionally comprise a visualization component 124 that can visualize facts and relationships corresponding to these facts that are defined in the data packets 120. Pursuant to an example, the visualization component 124 can be in communication with the search component 122 and can visualize relationships between facts and corresponding documents/authors/other annotations retrieved by the search component 122. An exemplary visualization that can be output by the visualization component 124 is discussed below. It is to be understood, however, that any suitable manner for visualizing relationships that are defined in the data packets 120 is contemplated and intended to fall under the scope of the hereto appended claims.

The aggregation system 110 may further optionally include a mining component 126 that performs a data mining function over the data packets 120 in the data repository 118. For instance, the mining component 126 may be configured to search for patterns in the data packets 120 retained in a data repository 118 such that, for example, identities of authors that comment on a particular topic frequently can be ascertained, identities of authors that are frequently co-cited can be obtained, etc. Relationships or patterns located by the mining component 126 can be output or can influence searches undertaken by the search component 122.

Figure 2:
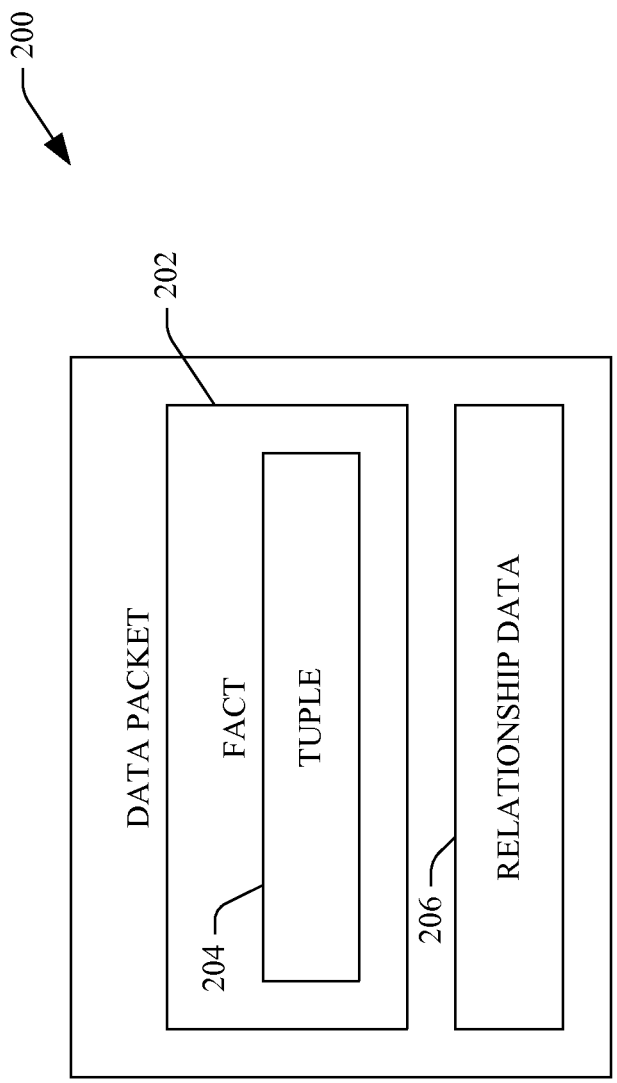
FIG. 2 is a functional block diagram of an exemplary data packet that comprises an annotation and relationship data.

With reference now to FIG. 2, an exemplary data packet 200 that can be transmitted from one of the computing devices 102-106 to the aggregation system 110 by way of the network 112 is illustrated. The data packet 200 comprises a fact 202 that was assigned to a particular document being reviewed by way of the application 108 by the user of the computing device 102. As indicated above, the fact 202 can be approved by the user of the first computing device 102 regardless of whether the fact 202 was automatically generated through utilization of an extractor module or was modified or manually created by the user. The fact 202 comprises a tuple 204 of words or phrases. Specifically, the fact 202 comprises a first word or phrase, a second word or phrase, and a third word or phrase that relates the first word or phrase to the second word or phrase. In an example, the first word or phrase may be the subject of a sentence that is included in the document that was annotated, the second word or phrase can be an object included in the sentence of the document that was annotated, and the third word or phrase can be a predicate that relates the first word or phrase to the second word or phrase in the sentence. An example of a tuple can be, "Malaria is a mosquito-borne infectious disease." The first word or phrase in the tuple 204 can be "Malaria"; the second word or phrase can be "mosquito-borne infectious disease", and the third word or phrase can be the predicate "is".

The data packet 200 also comprises relationship data 206 that identifies relationships that correspond to the fact 202. For example, the relationship data 206 can include first data that identifies the document to which the fact 202 was assigned. In another example, the relationship data 206 can comprise second data that identifies an author of the document to which the fact 202 was assigned. Still further, the relationship data 206 can comprise third data that identifies an author/approver of the fact 202. Moreover, the relationship data 206 can identify a particular portion of the document to which the fact 202 was assigned (e.g., a particular paragraph or sentence in the document).

As described above, multiple data packets that have a form that is substantially similar or the same as the data packet 200 can be output by multiple different computing devices, wherein such data packets include various facts made to a plurality of documents authored by various different authors by a plurality of different annotators. Thus, two data packets may include identical facts, but these facts may be authored by different individuals and/or assigned to different documents. It may aid a researcher to have knowledge that two different documents have been assigned identical facts from two separate annotators, thereby indicating that there is some relationship between those two documents. Further, in the field of web search, commonalities between annotations assigned to different web pages can be utilized by a search engine, for instance, in connection with providing search results to users. Still further, documents, annotations, authors, etc. can be clustered based at least in part upon content of data packets transmitted to the aggregation system 110 from the computing devices 102-106. These clusters can be utilized by the search component 122 when outputting search results responsive to receipt of a query, can be utilized for advertising purposes to select an advertisement to provide to an individual, or can be used for a variety of other purposes.

Figure 3:
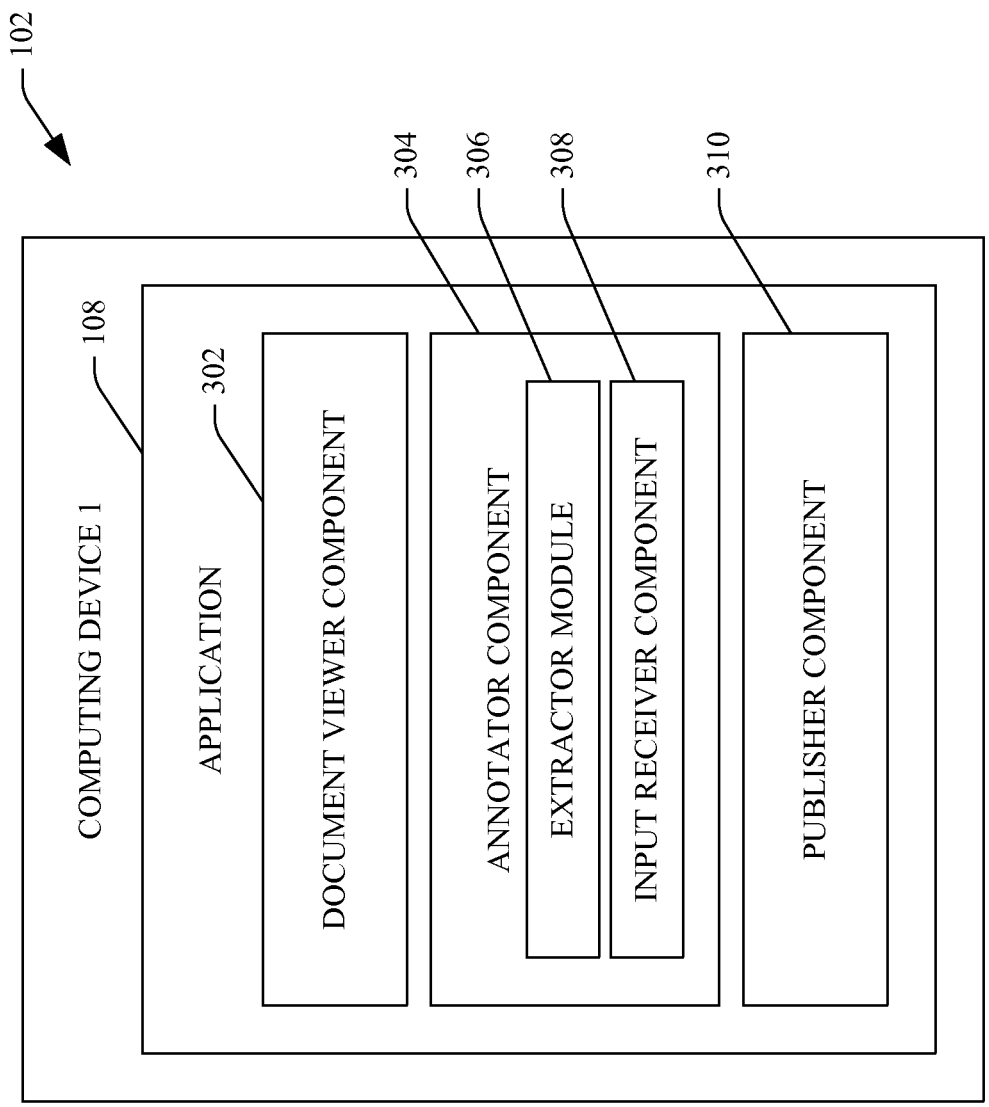
FIG. 3 is a functional block diagram of a computing device that has an application executing thereon that can be utilized to publish user-approved annotations to documents.

Referring now to FIG. 3 an exemplary depiction of the first computing device 102 is illustrated. As indicated above, the first computing device 102 comprises the application 108 which can be a word processing application, an Internet browser, or other suitable application that is configured to display documents to users. The application 108 comprises a document viewer component 302 that facilitates displaying text or images in a document to a user. That is, the document viewer component 302 can receive a data file and display text or images in human readable format on a display of the computing device 102, thereby allowing the user of the computing device 102 to review a document that is being displayed by the application 108.

The application 108 executing on the first computing device 102 further comprises an annotator component 304 that is configured to assign annotations (facts) to portions of the document being displayed by the document viewer component 302 to the user, wherein such annotations have been approved by the user. Pursuant to an example, the annotator component 304 can comprise at least one extractor module 306 that is configured to extract text from a document that is being reviewed by the user. Pursuant to an example, the extractor module 306 can be configured to search text of the document for a particular word or format. Pursuant to an example, it may be desirable to annotate each sentence that includes a citation to a different document. In such a case, the extractor module 306 can locate sentences that have citations to other documents therein, and can automatically extract annotations as described above (wherein the annotations comprised the tuple). Once the extractor module 306 locates sentences of the aforementioned type, the extractor module 306 can be configured to analyze such sentence for semantics of the sentence. That is, the extractor module 306 can be configured to extract a tuple from the sentence wherein, for example, the tuple comprises a subject-predicate-object triple.

The annotator component 304 can also comprise an input receiver component 308 that is configured to receive user input with respect to an annotation generated by the extractor module 306 and/or to receive a manually generated annotation that comprises a tuple. For example, an automatically generated annotation (by the extractor module 306) can be provided to the document viewer component 302, which can present the annotation to the user. The user may wish to modify the annotation to add or change particular words or phrases in the annotation or to remove words or phrases from the annotation. The input receiver component 308 can receive this user input and the annotation can be modified pursuant to input of the user. In another example, the user may wish to provide an annotation that was not automatically generated by the extractor module 306. In such a case, for instance, the user can select a particular sentence being displayed to the user by the document viewer component 302 and can manually generate an annotation that is to correspond to such sentence. Again, this manual annotation can comprise the tuple that has been described above.

Once the user has completed annotating the document, the user may wish to cause such annotations to be shared with others. To that end, the application 108 can further comprise a publisher component 310 that can publish annotations (facts) to a data store that is accessible to others by way of the network 112. With more specificity, the publisher component 310 can generate a data packet such as the data packet 200 described previously. Therefore, the publisher component 310 can cause an annotation generated by way of the annotator component 304 to be included in the data packet and can also cause relationship data to be included in such data packet. Once the data packet has been generated, the publisher component 310 can cause the data packet to be transmitted to a particular location by way of the network 112. In an example, the publisher component 310 can have knowledge of an IP address, where annotations from multiple users across multiple documents are retained. Upon the user of the first computing device 102 indicating that she wishes that annotations be published, the publisher component 310 can generate the aforementioned data packet and cause the data packet to be transmitted to a computing address that is assigned the IP address known by the publisher component 310. Other mechanisms for causing data packets as described herein to be retained in a data repository that is accessible to others by way of a network connection are contemplated by the inventors and are intended to fall under the scope of the hereto appended claims. Furthermore, while FIG. 3 has been described in connection with the first computing device 102, it is to be understood that the computing devices 104-106 can also include the components shown to be included in the first computing device 102.

Figure 4:
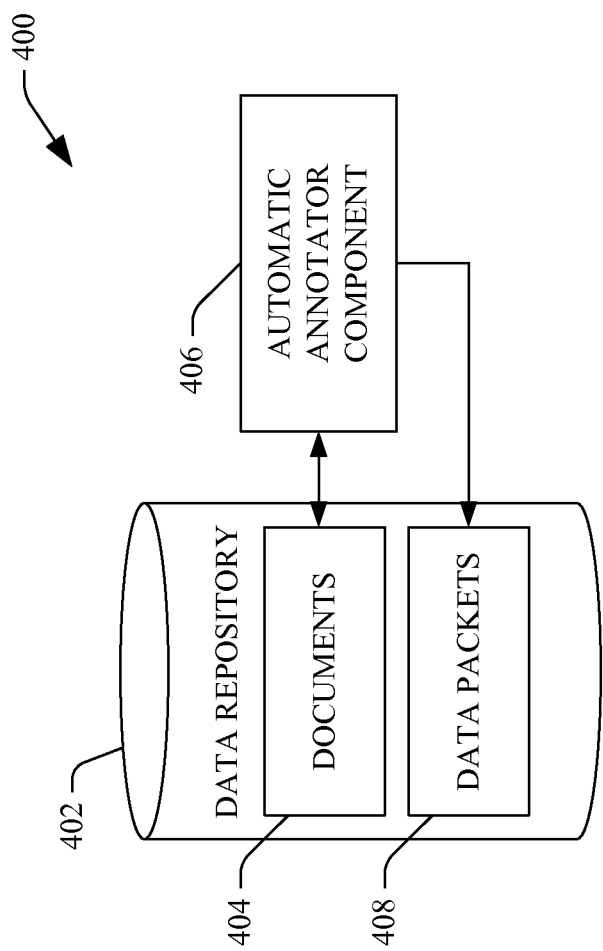
FIG. 4 is a functional block diagram of an exemplary system that facilitates automatically generating annotations to documents and aggregating such annotations.

Referring now to FIG. 4, another exemplary system 400 that facilitates aggregating annotations that have been assigned to documents is illustrated. The system 400 comprises a data repository 402. The data repository 402 comprises a plurality of documents 404, wherein he documents 404 can be word processing documents, web pages, documents in .pdf format, or some combination thereof. The system 400 further comprises an automatic annotator component 406. For instance, the automatic annotator component 406 can automatically generate annotations of the form described above, such that the annotations comprise a tuple of words or phrases. Therefore, the automatic annotator component 406 can comprise the extractor module 306, which can be configured to automatically generate annotations pertaining to a particular word, topic, sentence structure, etc. Additionally, the automatic annotator component 406 can cause relationship data to be retained with annotations that were automatically generated. The relationship data can indicate an identity of the document that corresponds to the annotation, an identity of the author of the document that corresponds to the annotation, etc. Thereafter, the automatic annotator component 406 can cause a plurality of data packets 408 to be retained in the data repository 402. For instance, these data packets 408 can be retained in accordance with a particular database structure such that they are in a form that is suitable for computer processing. Pursuant to an example, the annotations can be considered by a search engine when a user issues a query. For instance, a document that has been assigned an annotation may be given greater weight than a document not assigned an annotation. Further, documents with annotations that comprise text included in the query can be ranked higher in search results output by a search engine than documents without an annotation with the text assigned thereto.

Figure 5:
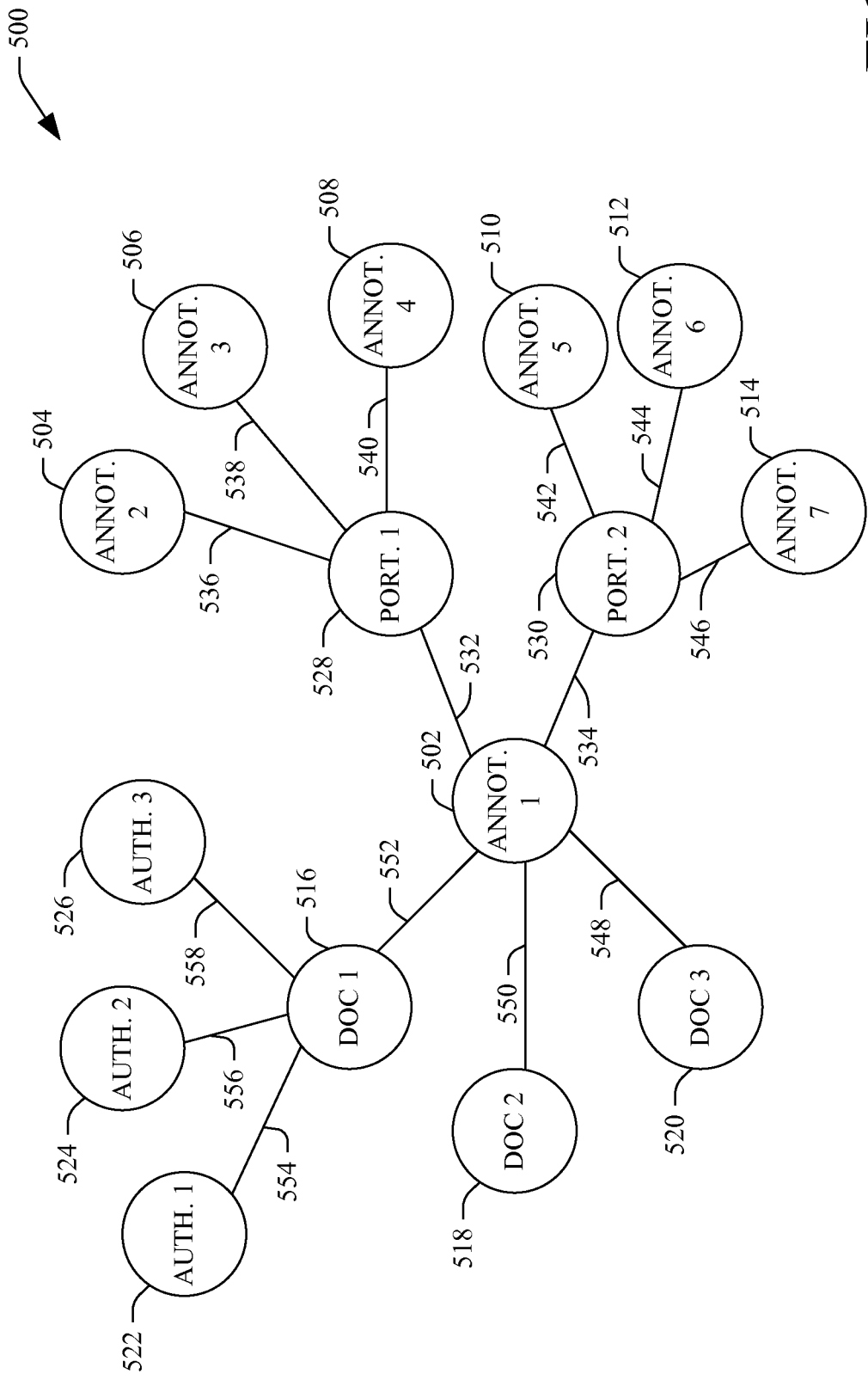
FIG. 5 is an exemplary visualization of annotations, related documents, and related authors.

With reference now to FIG. 5, an exemplary visualization 500 that can be presented to a user is illustrated. The visualization 500 can display various relationships between annotations, authors, documents and the like to a user that is, for instance, performing a search in a particular research field. In the exemplary visualization 500, such visualization 500 is depicted as a graph that comprises a plurality of nodes and corresponding edges. These nodes and edges can be displayed as a plurality of selectable graphical icons in a graphical user interface. While a graph of this form is one manner that data can be visualized, is to be understood that other visualization schemes are contemplated.

The exemplary visualization 500 comprises a plurality of nodes 502-530. Additionally, the visualization 500 comprises a plurality of edges 532-558 that couple nodes, wherein an edge between two nodes indicates some relationship between entities represented by the nodes. Pursuant to an example, the visualization 500 may be presented to the user responsive to the user performing a search that matches a first annotation that is represented by the node 502. Edges 548, 550 and 552 between the node 502 and nodes 516, 518 and 520, respectively, indicate that document one, document two and document three, which are represented by the nodes 516-520, include the annotation represented by the node 502. Thus, the viewer of the visualization 500 can quickly ascertain that documents one, two and three comprise the first annotation.

The visualization 500 further comprises the nodes 522, 524 and 526, which represent three different authors. The edges 554, 556 and 558 between the nodes 516 and 522, the nodes 516 and 524, and the nodes 516 and 526 indicate that the authors represented by the nodes 522-526 authored the document represented by the node 516.

As has been described herein, the annotation represented by the node 502 comprises a tuple. Pursuant to an example, the visualization 500 can be configured to display portions of the tuple. For instance, if the tuple comprises a subject of a sentence, a predicate, and a corresponding object of the sentence, then portions of the annotation may comprise a subject and an object. The node 528 can represent a subject of the first annotation and the node 530 can represent an object that is in the first annotation. The edges 532 and 534 can indicate to the viewer that the nodes 528 and 530 represent portions of the annotation represented by the node 502.

The nodes 504, 506 and 508 can represent other annotations that have been assigned to documents by users that include the portion of the annotation represented by the node 528. This relationship between the portion represented by the node 528 and the annotations represented by the nodes 504-508 is illustrated to the user by the edges 536-540.

Similarly, the nodes 510, 512 and 514 represent annotations that comprise the portion of the annotation represented by the node 530. Again, this relationship between the portion of the annotation that is represented by the node 530 and the annotations represented by the nodes 510-514 is depicted to the user via the edges 542, 544 at 546, respectively.

Furthermore, the visualization 500 can be interactive such that if the viewer selects one of the nodes shown in the visualization, the visualization can change and additional information can be provided to the user. For instance, a number of nodes displayed to the user may be constrained based upon display screen real estate that is available to display the visualization 500. Accordingly, selection of a different node can cause other nodes that are not shown in this visualization 500 to be presented to the user, thereby illustrating to the user a network of relationships between annotations, documents, authors, annotators, etc.

Moreover, different nodes and/or edges can be provided with different colors or line weights to indicate a type of entity that the nodes represent and/or strength of a relationship between entities. For instance, nodes that represent annotations can be displayed in a first color, nodes that represent documents can be displayed in a second color, nodes that represent authors can be displayed in a third color, and so on.

Figure 6:
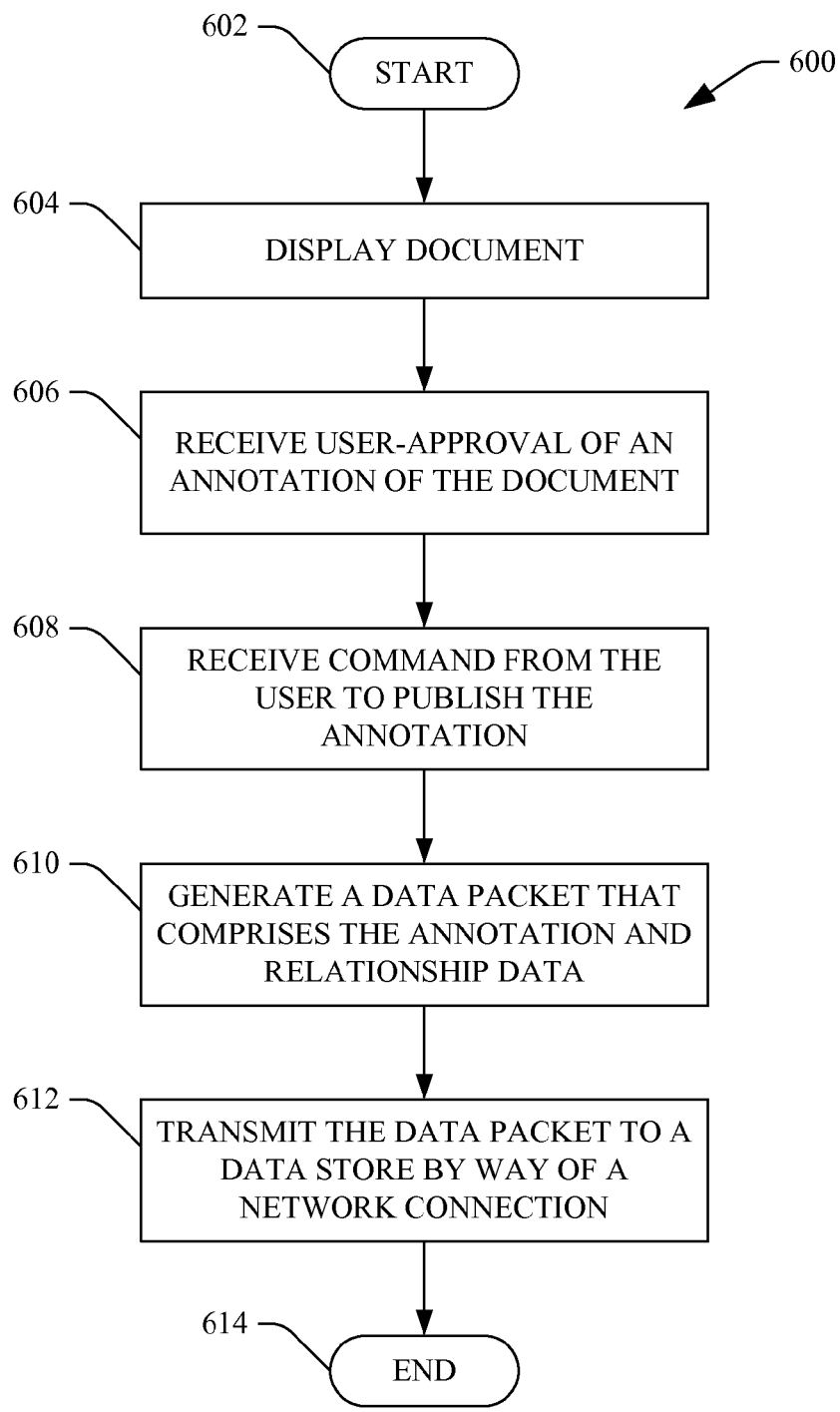
FIG. 6 is a flow diagram that illustrates an exemplary methodology for aggregating annotations made to documents by users.
Figure 7:
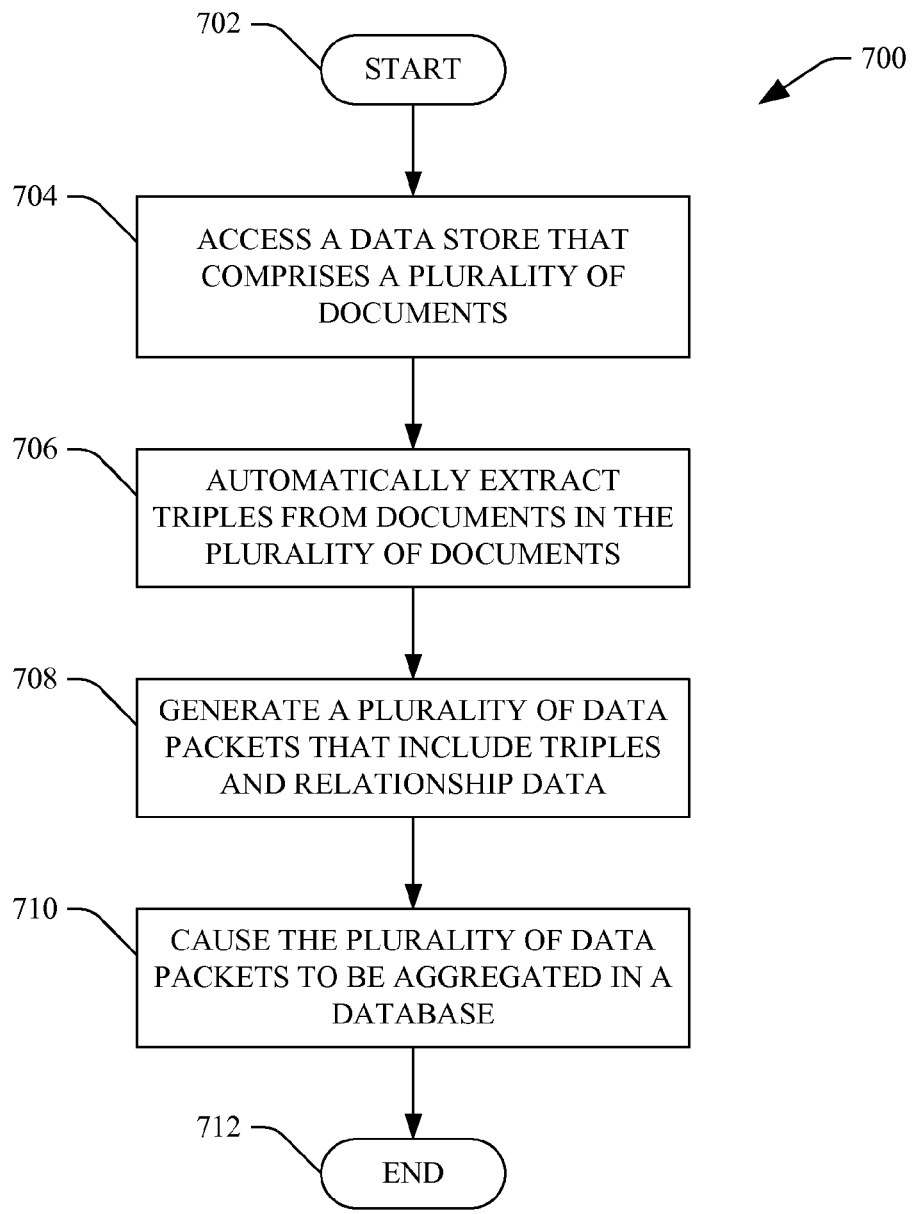
FIG. 7 is a flow diagram that illustrates an exemplary methodology for automatically aggregating annotations to documents in a data repository.
Figure 8:
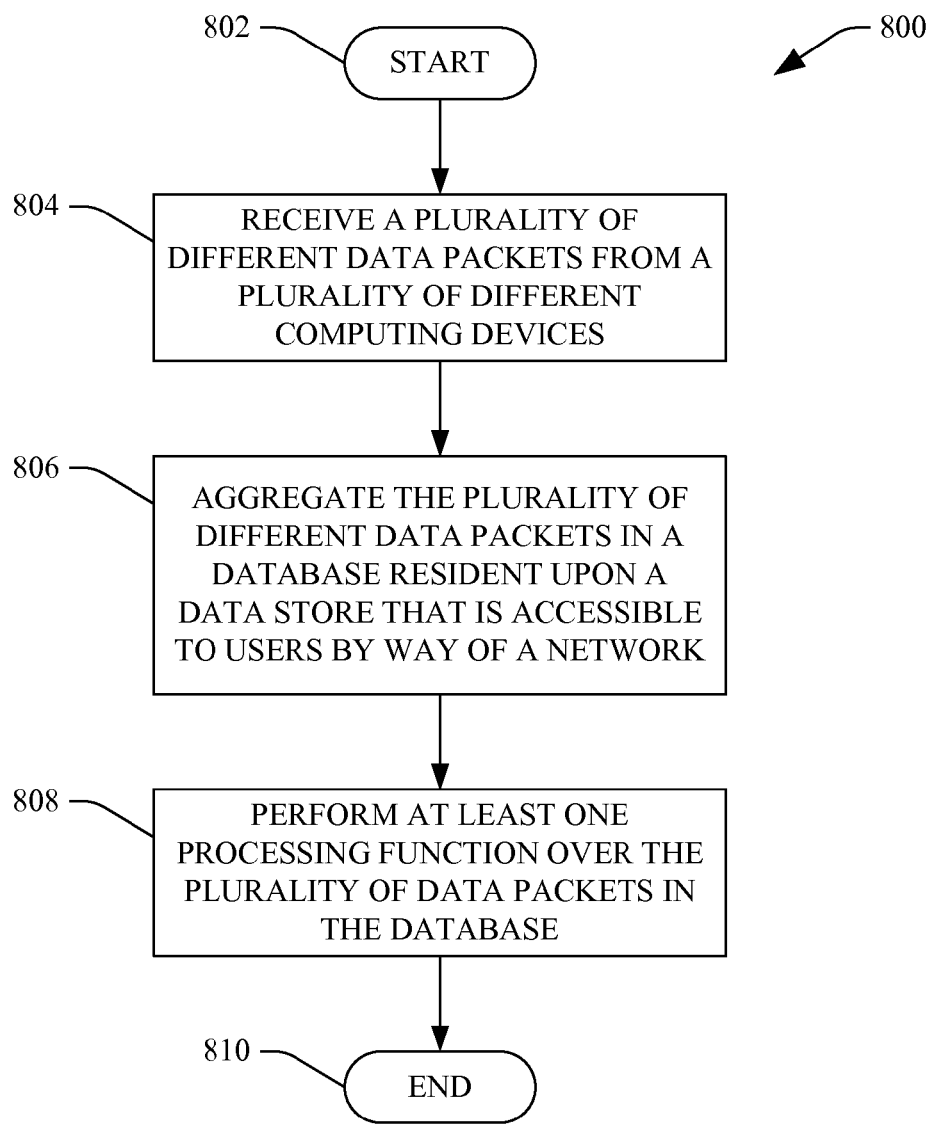
FIG. 8 is a flow diagram that illustrates an exemplary methodology for performing at least one processing function over an aggregation of annotations made to a plurality of different documents.

With reference now to FIGS. 6-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 6, an exemplary methodology 600 that facilitates aggregating data packets that comprise annotations is illustrated. The methodology 600 starts at 602, and at 604 a document is displayed to a user through utilization of an application executing on a computing device of the user. As mentioned previously, a document may be a word processing document, a web page, or the like.

At 606, user approval of an annotation in the document is received. For instance, the user approval can be provided to an automatically generated annotation (an annotation generated by way of an extractor module). In another example, the annotation may be a user generated annotation, wherein it can be inferred that the user approves of her own annotation. In still yet another example, the annotation may be an automatically generated annotation that has been in some way modified by the user.

At 608, a command is received from the user to publish the annotation. In other words, the user wishes that the annotation and associated data is available to others to search or utilize for visualization. At 610, responsive to receiving a command from the user to publish the annotation, a data packet can be generated that comprises the annotation and relationship data.

At 612, the data packet generated at 610 is transmitted to a data store by way of a network connection. The data packet can then be aggregated with other data packets of substantially similar format. The methodology 600 completes at 614.

With reference now to FIG. 7, an exemplary methodology 700 that facilitates aggregating a plurality of data packets in a database is illustrated. The methodology 700 starts at 702, and at 704 a data store is accessed that comprises a plurality of computer readable documents, wherein the computer readable documents comprise at least some text.

At 706, tuples are automatically extracted from documents in the plurality of documents. At 708, a plurality of data packets are generated, wherein each data packet in the plurality of data packets includes a tuple and relationship data. At 710, the plurality of data packets are caused to be aggregated in a database. At such point in time, these aggregated data packets can be searched over or processed in some other way. The methodology 700 completes at 712.

Turning now to FIG. 8, an exemplary methodology 800 that facilitates aggregating data packets in a searchable data repository is illustrated, wherein the data packets comprise an annotation to a document and corresponding relationship data. The methodology 800 starts at 802, and at 804 a plurality of different data packets are received from a plurality of different computing devices. In other words, annotations made by different users to different documents are received at a data repository together with corresponding relationship data.

At 806, the plurality of different data packets are aggregated in a database that is resident upon a data store that is accessible to users by way of a network. For instance, the database can be a searchable database such that users can issue queries over contents of the database.

At 808, at least one processing function is performed over at least one of the data packets in the database. For example, the at least one processing function can be a search over data packets in the database based at least in part upon a query. In another example, the at least one processing function can be performing or executing a data mining algorithm over data packets in the database. In still yet another example, at least one function can be visualizing relationships between annotations, documents, authors, annotators and the like. The methodology 808 completes at 810.

Figure 9:
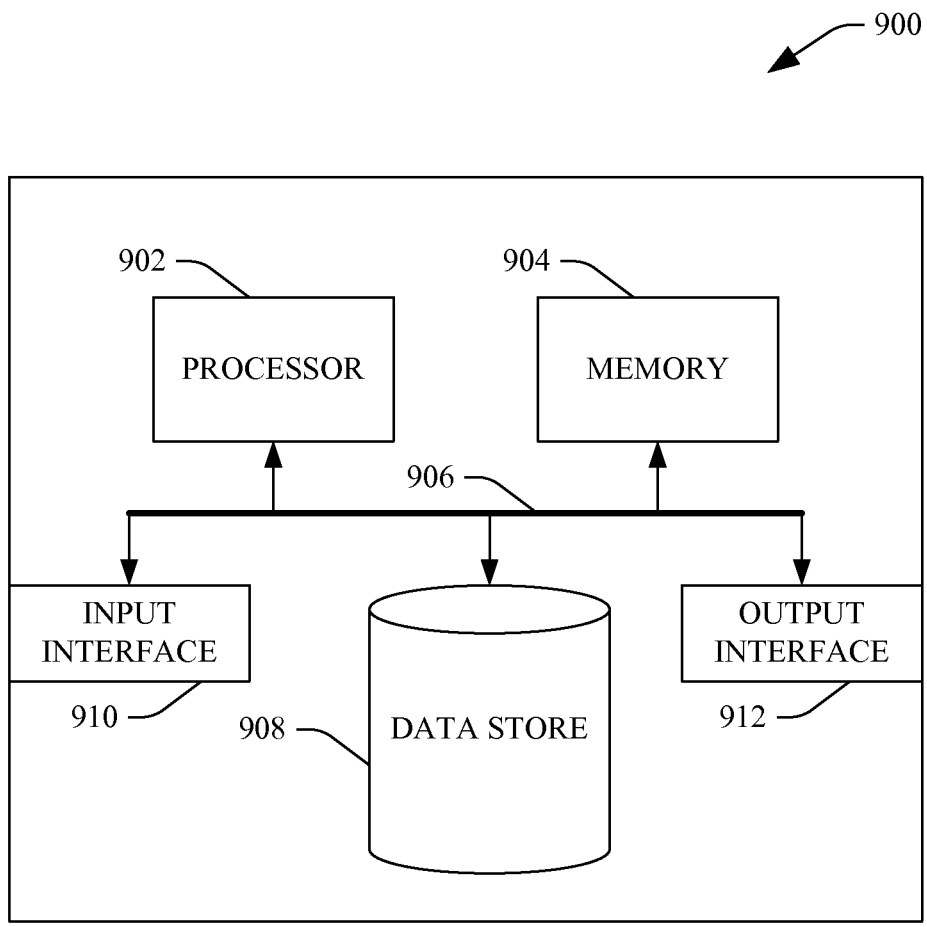
FIG. 9 is an exemplary computing system

Now referring to FIG. 9, a high-level illustration of an exemplary computing device 900 that can be used in accordance with the systems and methodologies disclosed herein is illustrated. For instance, the computing device 900 may be used in a system that supports annotating documents. In another example, at least a portion of the computing device 900 may be used in a system that supports aggregating annotations in a searchable database. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store documents, annotations, relationship data, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, documents, annotations, relationship data, etc. The computing device 900 also includes an input interface 910 that allows external devices to communicate with the computing device 900. For instance, the input interface 910 may be used to receive instructions from an external computer device, a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component", "system", and "module" are intended to encompass hardware, software, or a combination of hardware and software. Thus, for example, a system, component, or module may be a process, a process executing on a processor, or a processor. Additionally, component, system, or module may be localized on a single device or distributed across several devices. Furthermore, a component, system, or module may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
receiving, from a plurality of different computing devices and over a respective plurality of network connections, a plurality of data packets, wherein the plurality of different computing devices are operated by a plurality of different users, wherein each data packet in the plurality of data packets comprises:
an annotation that has been assigned to a document by a respective user, wherein the annotation is a tuple that comprises a first word or phrase extracted from the document, a second word or phrase extracted from the document, and a third word or phrase extracted from the document, wherein the third word or phrase relates the first word or phrase to the second word or phrase; and
relationship data that indicates that the annotation has been assigned to the document, wherein each data packet comprises a different annotation, and each data packet in the plurality of data packets has a same format;
aggregating the plurality of data packets in a data repository to form a network of knowledge, wherein the data repository is accessible to a processor; and
utilizing the processor to perform at least one processing function over at least one data packet in the data repository.

2. The method of claim 1, wherein the first word or phrase in the tuple is a subject of a parent phrase in the document, the second word or phrase in the tuple is an object of the parent phrase, and the third word or phrase in the tuple is a predicate that relates the subject with the object.

3. The method of claim 1, wherein the relationship data further identifies the user that assigned the annotation to the document.

4. The method of claim 1, wherein the annotation is automatically generated by extracting the tuple from a sentence of the document, and wherein the user assigns the annotation to the document in response to the annotation being generated.

5. The method of claim 1, wherein the data repository is accessible to a client computing device by way of an Internet browser.

6. The method of claim 1, wherein the relationship data further identifies a portion of the document that has been assigned the annotation.

7. The method of claim 1, wherein documents that have been assigned annotations are documents generated by way of a markup language.

8. The method of claim 1, wherein documents that have been assigned annotations are word processing documents.

9. The method of claim 1, wherein utilizing the processor to perform the at least one processing function over at least one data packet in the data repository comprises searching over the at least one data packet responsive to receipt of a query from a user.

10. The method of claim 9, wherein utilizing the processor to perform at least one processing function over at least one data packet in the data repository comprises generating a visualization for display on a computing device, wherein the visualization comprises a first graphical icon that is representative of a first document, a second graphical icon that is representative of a second document, and an edge between the first graphical icon and the second graphical icon that indicates that an author has assigned separate annotations to the first document and the second document.

11. The method of claim 9, wherein utilizing the processor to perform at least one processing function over at least one data packet in the data repository comprises generating a visualization for display on a computing device, wherein the visualization comprises a first graphical icon that is representative of the annotation, a second graphical icon that is representative of the document, and an edge between the first graphical icon and the second graphical icon that indicates that an author has assigned the annotation to the document.

12. The method of claim 11, wherein the visualization further comprises a fourth graphical icon that is representative of a second document and a second edge between the first graphical icon and the fourth graphical icon that indicates that the annotation has been assigned to the second document.

13. The method of claim 1, wherein utilizing the processor to perform at least one processing function over at least one data packet in the data repository comprises executing a data mining algorithm over the plurality of data packets in the data repository.

14. A system that comprises:
at least one processor; and
memory that stores instructions that, when executed by the at least one processor, cause the at least one processor to perform acts comprising:
receiving data packets from applications executing on client-computing devices by way of network connections, wherein the client computing devices are operated by different users, wherein each data packet in the data packets has a same format, and further wherein each data packet in the data packets comprises:
an annotation that has been generated by an extractor module configured to extract tuples from sentences in a respective document, the annotation assigned to the document by a respective user of a client computing device, wherein the annotation comprises a tuple, the tuple comprises a first word or phrase, a second word or phrase, and a third word or phrase, the first word or phrase is a subject of a parent phrase in the document, the second word or phrase is an obj ect of the parent phrase in the document, and the third word or phrase is a predicate of the parent phrase in the document; and
relationship data that indicates that the annotation has been assigned to the document; and
placing the data packets in a data repository to form a network of knowledge that is accessible to multiple users, wherein contents of the data repository are accessible to computing devices by way of a network.

15. The system of claim 14, wherein the network is the Internet.

16. The system of claim 14, the acts further comprising executing a search over the data packets in the data repository responsive to receipt of a query from a user.

17. The system of claim 14, wherein the applications executing on the client computing devices include a word processing application, wherein a user of the word processing application has assigned an annotation to a document utilizing the word processing application, and wherein a data packet that comprises the annotation is received subsequent to a different user of the word processing application approving the annotation for publishing.

18. The system of claim 14, wherein the applications executing on the client computing devices include an Internet browser, wherein a document in the documents is a web page, and wherein an annotation that is assigned to the web page is automatically generated.

19. Computer-readable memory comprising instructions that, when executed by at least one processor, cause the at least one processor to perform acts comprising:
  receiving, from a word processing application on a computing device, a data packet, wherein the data packet comprises:
    an annotation that corresponds to a portion of a document reviewed by a user of the word processing application, the annotation assigned to the portion of the document by the user, wherein the annotation comprises a tuple, wherein the tuple comprises a subject of a sentence or phrase in the document, an object of the sentence or phrase, and a predicate that relates the subject and the object; and
    relationship data that comprises:
      first data that indicates that the annotation has been assigned to the document;
      second data that identifies the portion of the document that corresponds to the annotation;
      third data that identifies an author of the document; and
      fourth data that identifies an author of the annotation; and
  repeating the act of receiving from a plurality of different computing devices operated by a plurality of different users, such that a plurality of data packets that comprise respective assigned annotations and relationship data are received, each data packet in the plurality of data packets has a same format;
  causing the plurality of different data packets to be retained in a searchable database to form a network of knowledge;
  receiving a query from another user;
  executing a search over the plurality of data packets in the searchable database responsive to receiving the query from the another user; and
  outputting search results to the another user subsequent to executing the search over the searchable database, wherein the search results comprise an indication of relationships between documents, document authors, and annotation authors.

20. The computer-readable memory of claim 19, wherein the annotation is automatically generated by extracting the tuple from the sentence or phrase.

* * * * *